(12) United States Patent
Easton et al.

(10) Patent No.: US 9,388,799 B2
(45) Date of Patent: Jul. 12, 2016

(54) DRIVE CIRCUIT FOR ACTUATING A SHAPE-MEMORY ALLOY ACTUATOR

(71) Applicant: CAMBRIDGE MECHATRONICS LIMITED, Cambridge, Cambridgeshire (GB)

(72) Inventors: Mark George Easton, Cambridge (GB); David Charles William Richards, Cambridge (GB)

(73) Assignee: CAMBRIDGE MECHATRONICS LIMITED, Cambridge, Cambridgeshire (GB)

( * ) Notice: Subject to any disclaimer, the term of this patent is extended or adjusted under 35 U.S.C. 154(b) by 0 days.

(21) Appl. No.: 14/439,347

(22) PCT Filed: Oct. 28, 2013

(86) PCT No.: PCT/GB2013/052807
§ 371 (c)(1),
(2) Date: Apr. 29, 2015

(87) PCT Pub. No.: WO2014/068294
PCT Pub. Date: May 8, 2014

(65) Prior Publication Data
US 2015/0260169 A1 Sep. 17, 2015

(30) Foreign Application Priority Data
Oct. 29, 2012 (GB) .................................... 1219422.1

(51) Int. Cl.
*G03B 5/00* (2006.01)
*F03G 7/06* (2006.01)
*G03B 3/10* (2006.01)

(52) U.S. Cl.
CPC *F03G 7/065* (2013.01); *G03B 3/10* (2013.01); *G03B 5/00* (2013.01); *G03B 2205/0046* (2013.01); *G03B 2205/0076* (2013.01)

(58) Field of Classification Search
USPC ......................................................... 396/133
See application file for complete search history.

(56) References Cited

U.S. PATENT DOCUMENTS

| | | | |
|---|---|---|---|
| 2007/0290701 A1* | 12/2007 | Nguyen | G01R 31/3655 324/117 H |
| 2009/0009656 A1* | 1/2009 | Honda | G03B 3/10 348/372 |
| 2010/0045214 A1 | 2/2010 | Matsuki | |
| 2013/0242150 A1* | 9/2013 | Wittenberg | G03B 9/08 348/294 |
| 2014/0055670 A1* | 2/2014 | Hongo | H04N 5/2253 348/374 |

FOREIGN PATENT DOCUMENTS

| | | |
|---|---|---|
| EP | 2012008 A2 | 1/2009 |
| WO | WO-2009071898 A2 | 6/2009 |

* cited by examiner

*Primary Examiner* — Clayton E Laballe
*Assistant Examiner* — Linda B Smith
(74) *Attorney, Agent, or Firm* — Harness, Dickey & Pierce, P.L.C.

(57) ABSTRACT

Methods and apparatus are disclosed for actuating a shape-memory alloy actuator. An example method comprises a measurement phase, in which a voltage is applied across a bridge comprising a sense resistor to measure the resistance of the shape-memory alloy actuator, and a drive phase, in which a bypass unit is used to bypass the sense resistor while still driving current through the shape-memory alloy actuator in order to drive the shape-memory alloy actuator.

19 Claims, 4 Drawing Sheets

DRIVE CIRCUIT FOR ACTUATING A SHAPE-MEMORY ALLOY ACTUATOR

CROSS REFERENCE TO RELATED APPLICATIONS

This application is a U.S. National Phase Application under 35 U.S.C. 371 of International Application No. PCT/GB2013/052807 filed on Oct. 28, 2013 and published as WO 2014/068294 A1 on May 8, 2014. This application claims priority to British Application No. 1219422.1 filed on Oct. 29, 2012. The entire disclosures of each of the above applications are incorporated herein by reference.

The present invention relates to the driving of Shape-Memory Alloy (SMA) actuators, for example in wire form. It is useful particularly in SMA actuators used in miniature devices such as miniature cameras used for example in portable electronic devices such as mobile phones.

Figure 1:
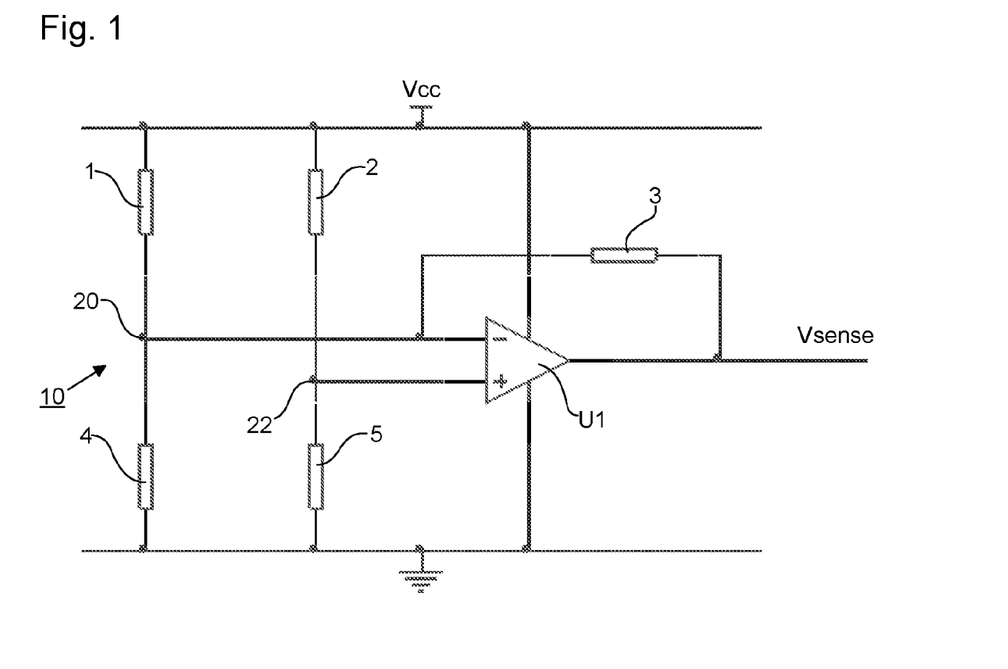
FIG. 1 depicts a circuit for detecting the resistance of an SMA actuator, comprising a bridge with a sense resistor and a differential amplifier.

Control of SMA actuators relies heavily on knowing the SMA resistance. Current/resistance sensing circuits are very well known. A typical circuit is shown in FIG. 1. This is a classic differential amplifier, comprising a bridge 10 with bridge resistors 1 and 4 (having resistances of R1 and R4 respectively), a sense resistor 2 (having resistance R2), and the SMA actuator 5 (having resistance R5), and an op-amp U1 with a gain-setting resister 3 (having resistance R3) for setting the gain. The output Vsense provided by the op-amp U1 is a measure of the resistance R5 of the SMA actuator 5. This type of circuit can be used to provide a highly accurate estimate of the resistance R5 of the SMA actuator 5 if the other resistances, R1-R4, are known accurately.

An efficient way to operate SMA actuators is to heat them through resistive (Joule) heating. One way to facilitate this is to make R2 relatively small, which allows larger currents to be driven through the SMA actuator.

Figure 2:
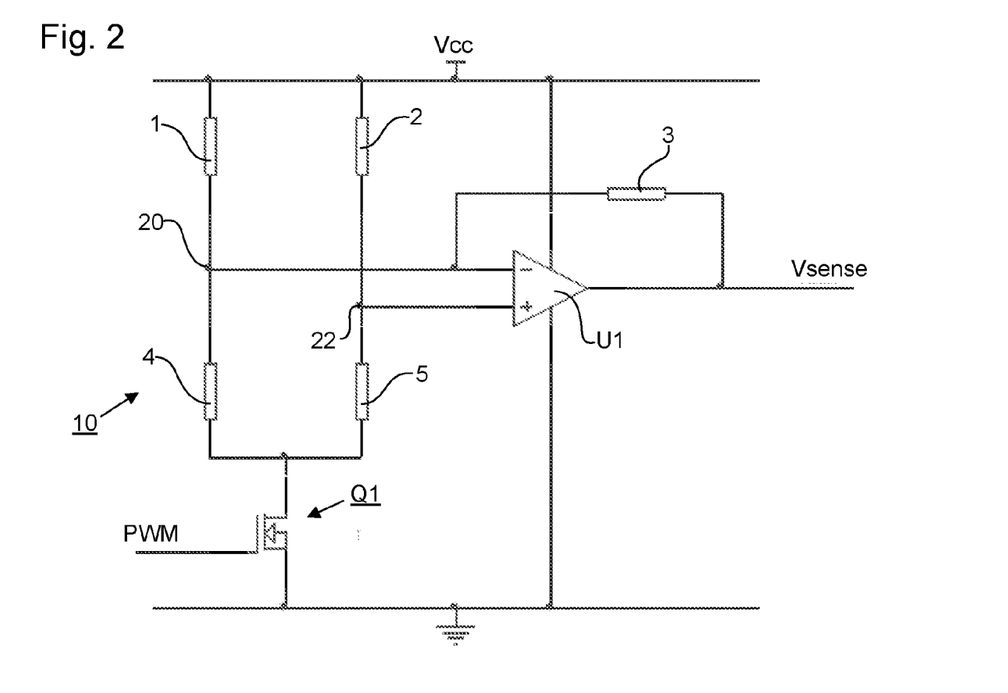
FIG. 2 depicts a prior art arrangement for driving a PWM current through the SMA actuator in the circuit of FIG. 1.

In most applications it is impractical to modulate the voltage Vcc applied across the bridge according to demand (purely for reasons of component size and cost, rather than technical feasibility). Given this, Pulse-Width Modulation (PWM) has been used as an alternative way of controlling power delivered to the SMA actuator. An example circuit using this technique is illustrated in FIG. 2. The circuit of FIG. 2 is the same as the circuit of FIG. 1 except that the voltage across the bridge is pulse-width modulated by MOSFET Q1 according to the applied signal PWM.

A problem with the circuit of FIG. 2 is that a trade-off is required. The resistance R2 needs to be made small to maximise power delivered to the SMA actuator 5 which it is desired to heat. However, the smaller R2 is, the more signal gain needs to be applied, which leads to considerable inefficiencies.

A further problem with the circuit of FIG. 2 is that it is difficult efficiently to provide power to the SMA actuator 5 with high resolution or precision.

It is an object of the invention to address at least partially one or more of the problems discussed above.

According to an aspect of the invention, there is provided a drive circuit for actuating a shape-memory alloy actuator, comprising: a resistance detecting circuit comprising a sense resistor and configured to receive the shape-memory alloy actuator; a sensing circuit for generating an output signal when a voltage is applied to the resistance detecting circuit to cause a current to be driven through both the sense resistor and the shape-memory alloy actuator, the output signal being based on said current and being a function of the difference between the resistance of the sense resistor and the resistance of the shape-memory alloy actuator; and a bypass unit configured to allow the sense resistor to be selectively bypassed, thereby allowing the drive circuit to be selectively operated in one of a measurement mode and a drive mode, the measurement mode being a mode in which the sense resistor is not bypassed and said output signal that is a function of the difference between the resistance of the sense resistor and the resistance of the shape-memory alloy actuator is obtained, and the drive mode being a mode in which a current is driven through at least the shape-memory alloy actuator but the sense resistor is bypassed, wherein said output signal is not obtained or said output signal is not a function, or is a weaker function, of the difference between the resistance of the sense resistor and the resistance of the shape-memory alloy actuator.

Thus, a bypass unit is provided that allows selective bypassing of the sense resistor. As a result, the sense resistor can be brought into the circuit only for the time necessary to make a measurement (of the resistance of the SMA actuator via the "output signal"), while in the "measurement mode", and then removed (substantially or completely, for example such that one or more orders of magnitude less current, or no current at all, is driven through the sense resistor for a given current through the SMA actuator), in the "drive mode", to allow a larger current to flow through the SMA actuator. Thus, dynamic range may be increased and/or no or less power is dissipated in the sense resistor while it is not being used. Thus, the negative impact of the sense resistor on the efficiency with which the SMA actuator can be driven is reduced. This allows improved driving efficiency and/or the use of a sense resistor having larger resistance. Increasing the resistance of the sense resistor facilitates more accurate and/or quicker (faster response time) monitoring of the resistance of the SMA actuator. Additionally or alternatively, the use of a sense resistor of larger resistance may allow cheaper and/or lower power electronics (e.g. cheaper and/or lower power op-amps) to be used for the resistance measurement.

Additionally or alternatively, the bypass unit provides the possibility for selectively switching the drive circuit between low and high power states. In the low power state, the sense resistor is bypassed less or not at all. This allows power to be provided, over a limited low power range, with higher power resolution (i.e. with the power level being set with greater precision). In the high power state, the sense resistor is bypassed to a greater extent than in the low power state, thus enabling higher powers to be delivered more efficiently.

The ability to switch to such a low power state may be useful where SMA actuators are to be driven effectively in a range of environments of different temperature. At higher temperatures, the amount of power that is required for heating the SMA actuator will generally be less than at lower temperatures. According to an embodiment, the drive circuit is configured to switch automatically to the low power state when a power to be delivered to the shape-memory alloy is determined to be below a predetermined threshold power. Additionally or alternatively, the drive circuit may be configured to switch automatically to the low power state when the ambient temperature is determined to be above a predetermined threshold temperature.

According to a further aspect, there is provided a method of actuating a shape-memory alloy actuator, comprising: in a measurement phase, applying a voltage across a bridge comprising a sense resistor to measure the resistance of the shape-memory alloy actuator; in a drive phase, using a bypass unit to bypass the sense resistor while still driving current through the shape-memory alloy actuator in order to drive the shape-memory alloy actuator.

Further embodiments of the invention will now be described, by way of example only, with reference to the accompanying drawings in which corresponding reference symbols indicate corresponding parts, and in which:

FIG. 7b depicts a power delivery stage of the example circuit of FIG. 7a.

Each of the hereinafter described drive circuits can be used in an SMA actuation apparatus such as a camera apparatus. In general, the SMA actuation apparatus will comprise a support structure and a movable element that is movable relative to the support structure. The drive circuit, in turn, is configured to drive one or more SMA actuators that control movement of the movable element. The driving of the SMA actuators will typically involve controlling the temperature of the SMA actuators in order to control their shape and/or the force(s) they apply to the movable element.

In the case of a camera apparatus the movable element will typically be a lens element. Such camera apparatus may be incorporated into a portable electronic device such as a mobile telephone, media player or portable digital assistant, for example, where miniaturisation is an important design criterion. Nonetheless, the same type of SMA actuation apparatus may in general be applied to any type of movable element including ones other than a lens element.

Figure 3:
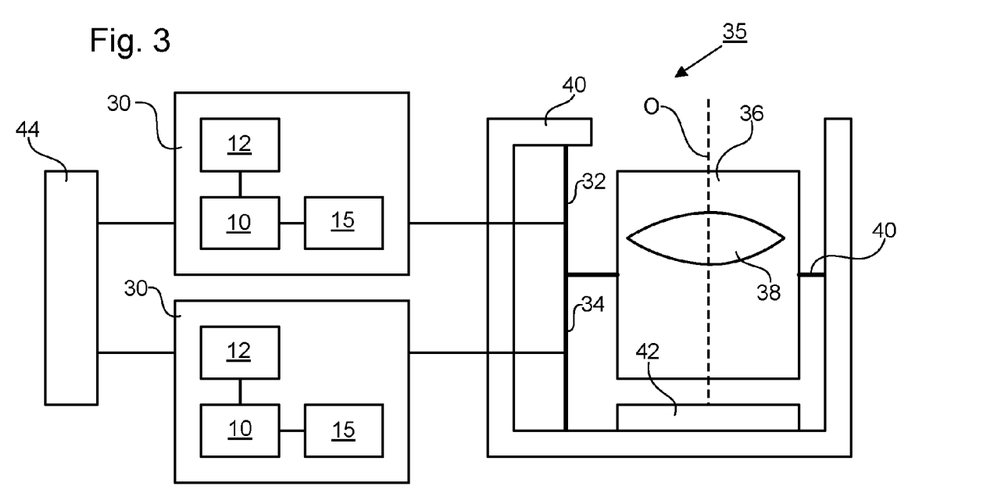
FIG. 3 depicts a camera apparatus as an example of an SMA actuation apparatus.

An example camera apparatus 35 is shown in FIG. 3 in cross-section taken along the optical axis O. The camera apparatus 35 comprises a lens element 36 supported on a support structure 40 by a suspension system 41 that takes the form of a flexure extending between the lens element 36 and the support structure 40. The suspension system 41 allows movement of the lens element 36 relative to the support structure 40 along the optical axis O. Thus, the lens element 36 is a movable element.

In the embodiment shown, the support structure 40 is a camera support that supports an image sensor 42 arranged along the optical axis O behind the lens element 36.

The lens element 36 supports a lens 38 arranged along the optical axis O, although in general any number of lenses may be provided. The camera apparatus 35 is a miniature camera in which the lens 38 (or the lenses if more than one is provided) has a diameter of at most 10 mm. The lens element 36 is arranged to focus an image onto the image sensor 42. The image sensor 42 captures the image and may be of any suitable type, for example a CCD (charge-coupled device) or a CMOS (complimentary metal-oxide-semiconductor) device. In operation, the lens element 36 is moved along the optical axis O to change the focus and/or magnification.

The camera apparatus 35 further comprises two SMA actuator wires 32 and 34 each connected in tension between the lens element 36 and the support structure 40 and configured to apply forces thereto when driven.

In the embodiment shown, each of the SMA actuators 32 and 34 is driven by a drive circuit 30. The amount of current and thus heating of the SMA actuator provided by each drive circuit 30 is in turn controlled by a control signal provided by a controller 44.

In an embodiment, the drive circuit 30 comprises a resistance detecting circuit 10, a sensing circuit 15 and a bypass unit 12. Details of each of these elements in the context of example embodiments are explained below.

Figure 4:
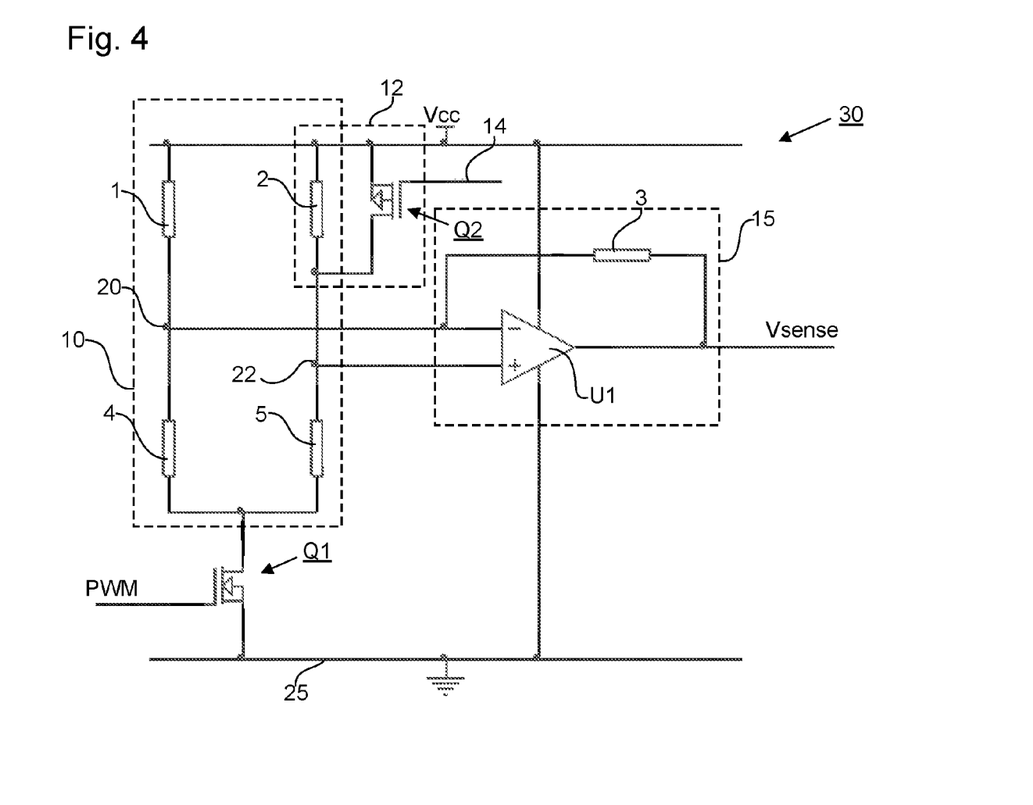
FIG. 4 depicts a drive circuit, comprising a bridge with a sense resistor in series with an SMA actuator, a differential amplifier and a bypass unit.

FIG. 4 depicts an example drive circuit 30 in further detail. The drive circuit 30 comprises a resistance detecting circuit 10 having a sense resistor 2 and which is configured to receive an SMA actuator 5. In the example shown, the resistance detecting circuit 10 comprises a bridge having the same components as the bridge 10 shown in FIGS. 1 and 2. In an embodiment, the bridge 10 comprises two branches with the sense resistor 2 and the SMA actuator 5 provided in series with each other on one of the branches.

The drive circuit 30 also comprises a sensing circuit 15 for generating an output signal when a voltage is applied to the resistance detecting circuit 10 to cause a current to be driven through both the sense resistor 2 and the SMA actuator 5. The output signal is based on the current (e.g. proportional to the current) and is a function of the difference between the resistance of the sense resistor 2 and the resistance of the SMA actuator 5. The resistance of the sense resistor 2 is known, so the output signal is a measure of the resistance of the SMA actuator 5.

In the embodiment shown, the sensing circuit 15 comprises a differential amplifier implemented by op-amp U1 and gain setting resistor 3. The op-amp U1 is connected to intermediate points 20 and 22 of the bridge 10 and is configured to amplify a difference in voltage between the two intermediate points 20 and 22. The bridge 10 is connectable (e.g. via a switching device) or connected at a high voltage side to a high voltage source Vcc and is connectable (e.g. via a switching device) or connected at a low voltage side to a low voltage source 25 (e.g. ground).

The drive circuit 30 further comprises a bypass unit 12. The bypass unit 12 is configured to allow selective "bypassing" or short-circuiting of the sense resistor 2. When the bypass is connected, the sense resistor 2 is effectively removed from the circuit as current which would previously have flowed through the sense resistor 2 will flow instead (or at least predominantly) through the bypass. It is expected that the bypass will typically result in a several orders of magnitude drop in the current flowing through the sense resistor (although smaller or greater reductions in the current flow would also be useful). The result of this is that in the drive mode, with the sense resistor bypassed, no output signal is obtained, or no output that is a function of the difference between the resistance of the sense resistor 2 and the resistance of the SMA actuator 5 is obtained, or an output signal is obtained that is much more weakly dependent on (i.e. is a weaker function of) the difference in resistance between the sensor resistor 2 and the SMA actuator 5.

In the example shown, the bypass unit 12 is implemented using a MOSFET Q2 that is configured to respond to an input signal 14 provided by a controller 44 (see FIG. 3).

In the embodiment shown, the drive circuit 30 modulates a drive voltage Vcc in order to provide a modulated voltage across the bridge 10. In the example shown, the driving voltage is modulated by a pulse-width modulation signal PWM provided by the controller 44 to a MOSFET Q1. The combination of controller 44 and MOSFET Q1 may therefore be referred to as a pulse-width modulator. When the signal 14 applied to the bypass unit 12 causes the sense resistor 2 not to be bypassed, current driven by the voltage across the bridge 10 flows through SMA actuator 5 and the sense resistor 2. This may be referred to as a measurement phase or measurement mode. When the signal 14 applied to the bypass unit 12 causes the sense resistor 2 to be bypassed, current driven by the voltage across the bridge 10 flows through the SMA actuator 5 but not the sense resistor 2 (or at least to a much lesser extent than without the bypass). This may be referred to as a drive phase or drive mode.

As discussed above, this arrangement makes it possible for the resistance R2 of the sense resistor 2 to be made relatively large, thus improving the efficiency with which the resistance of the SMA actuator 5 can be measured, while at the same time allowing a relatively large current to be driven through the SMA actuator 5 for a portion, preferably a majority, of the drive cycle.

In the example of FIG. 4, the sense resistor 2 is connected between the high voltage side of the bridge (held at Vcc in the example shown) and the intermediate point 22 and the bypass unit 12 is configured to provide a switchable, short-circuiting connection between the intermediate point 22 and the high voltage side of the bridge 10 (or the high voltage source at Vcc). However, this positioning is not essential. In an alternative embodiment, the sense resistor 2 is connected between the low voltage side of the bridge (switchably connected to ground in the example shown) and the intermediate point 22 and a bypass unit is provided that enables a switchable, short-circuiting connection to be made between the intermediate point 22 and the low voltage side of the bridge (or ground).

Figure 5:
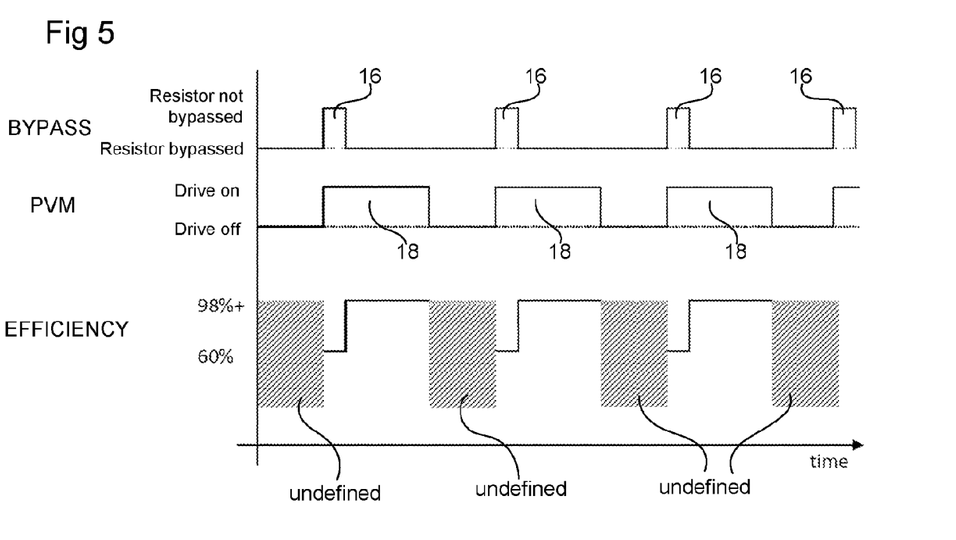
FIG. 5 depicts example drive patterns for controlling pulse-width modulation and operation of the bypass unit of the circuit of FIG. 4.

FIG. 5 illustrates an example drive pattern for driving the MOSFETs Q2 and Q1 (corresponding to the bypass control signal 14 for controlling operation of the bypass unit 12 and the pulse-width modulation control signal PWM for controlling the pulse-width modulation, respectively). As can be seen, the control signals 14 and PWM are synchronized with each other.

The top graph shows the drive pattern for Q2 (signal 14) and shows switching between a state in which the sense resistor 2 is not bypassed (high) and a state in which the sense resistor 2 is bypassed (low). The high periods may be referred to as sensing pulses 16.

The middle graph shows the drive pattern for Q1 (signal PWM) and shows switching between a state in which the driving portion of the pulse-width modulation is ON (high) and a state in which the driving portion of the pulse-width modulation is OFF (low). The high periods may be referred to as drive pulses 18. In the example shown, the sensing pulses 16 are substantially less than half the length of the drive pulses 18. This approach provides high efficiency but is just one example configuration. In other embodiments, the relative durations of the sensing and drive pulses 16,18 may be different.

The efficiency with which the SMA actuator 5 is driven increases as the resistance through the combination of SMA actuator 5 and sense resistor 2 or bypass decreases. Thus, the efficiency is higher when the sense resistor 2 is bypassed. For the particular embodiment described the efficiency is greater than 98% when the sense resistor 2 is bypassed and about 60% when the sense resistor 2 is not bypassed, as illustrated in the lower graph of FIG. 5.

The phasing of the bypass (i.e. sensing pulses 16) relative to the PWM drive pulses 18 may be arranged in several different ways. In an embodiment, the phasing is arranged so that the sense pulse 16 is at or near the start of the drive pulse 18 (e.g. such that the start of a period during which the sense resistor is bypassed substantially coincides with the start of a period during which the pulse-width modulation control signal is high. This may be advantageous because it tends to provide the lowest correlation of resistance with output duty cycle.

In the embodiment shown in FIG. 5, the sense resistor 2 is inserted once every drive cycle. However, this is not essential. In other embodiments, the sense resistor 2 is inserted more than once in each drive cycle. Alternatively, it may be that resistance information is not needed every drive cycle, in which case the sense resistor 2 may be inserted in fewer than all of the drive cycles.

According to an embodiment, switching the bypass unit 12 to include the sense resistor 2 (i.e. so that the sense resistor 2 is not bypassed) enables power to be provided to the load resistor 5 with a higher effective power resolution than would be possible with the sense resistor 2 bypassed, albeit over a smaller (lower) range of power. Such a state may be useful, for example, in relatively hot ambient conditions, where the amount of electrical heating that needs to be provided by the drive circuit is naturally lower than in cooler ambient conditions.

In an embodiment, such higher power resolution driving is achieved by extending the period that the sense resistor 2 is in the circuit (not bypassed). In an embodiment, the sense resistor 2 is kept in the circuit for the entirety of the drive pulse (such that the sense pulse 16 is equal to or longer than the drive pulse 18). Overall efficiency is relatively low (i.e. the ratio of power delivered to load resistor 5 relative to power taken from supply), but given that not much power is demanded overall, this is not necessarily a problem.

In an embodiment, the drive circuit 30 is configured to be switchable between a first state ("high power state") in which the drive circuit 30 is driven in a "high power/high efficiency" mode and a second state ("low power state") in which the drive circuit 30 is driven in a "lower power/higher power resolution" mode. In line with the above discussion, in an example of the high power/high efficiency mode the sense pulses 16 are significantly shorter than the drive pulses 18 and in an example of the lower power/higher power resolution mode the sense pulses 16 are equal to or longer than the drive pulses 18. In an embodiment, the drive circuit 30 is configured to be automatically switched from the first state to the second state when a power to be delivered to the SMA actuator 5 is determined to have fallen below a predetermined threshold power. Alternatively or additionally, the drive circuit 30 may be configured to be automatically switched from the first state to the second state when it is determined (e.g. using a temperature sensor) that the ambient temperature is above a predetermined threshold temperature.

Figure 6:
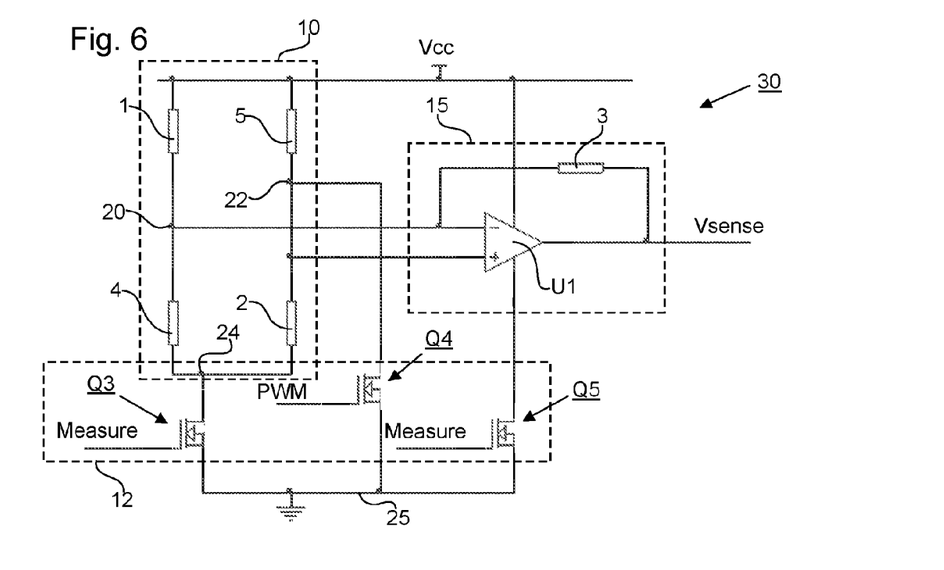
FIG. 6 depicts a variation on the circuit of FIG. 4 in which the sense resistor is positioned on the low voltage side of the bridge rather than on the high voltage side of the bridge.

In an embodiment, the sense resistor 2 is positioned in the low voltage side of the bridge 10. An example of such a configuration is depicted in FIG. 6. Here, the sense resistor 2 is connected between the low voltage side 24 of the bridge 10 and the intermediate point 22. An advantage of this approach is that it allows an N-FET to be used for implementing the bypassing rather than a P-FET such as would typically be used for the MOSFET Q2 shown in FIG. 4.

In the particular example shown, MOSFET Q3 is used selectively to bypass the sense resistor 2 in accordance with an input control signal MEASURE from controller 44 (see FIG. 3). When the MOSFET Q3 disconnects the connection between ground and the point 24 in the bridge 10 and the point 22 is connected to ground via the PWM MOSFET Q4, current flows through the SMA actuator 5 but not the sense resistor 2, thus effectively bypassing the sense resistor 2. In contrast, when the MOSFET Q3 connects point 24 to ground and the PWM MOSFET Q4 disconnects point 22 from ground, current flows in series through both the sense resistor 2 and the SMA actuator 5. In this state, the MEASURE signal is also fed to the (optional) MOSFET Q5 (discussed below), which causes the op-amp U1 to be powered and allows output of Vsense. As before, Vsense provides a measure of the resistance of the SMA actuator 5. Thus, in the example of FIG. 6, the combination of the MOSFETs Q3 and Q4 and associated circuitry, and optionally the MOSFET Q5 and associated circuitry, may be considered as the bypass unit 12.

In other embodiments, more of the circuitry to measure resistance can be routed through the 'bypass' FET Q4 (although in this configuration it takes the form of a 'measure resistance' FET). This means that the power supply can be removed from op-amp U1 when measurements are not being taken, providing useful further power savings. In this configuration, the measure and PWM features are separate, with the result that there is no clean way to switch from drive mode to measurement mode). The two modes may therefore become separated in time.

In the embodiment of FIG. 6, a separate optional MOSFET Q5 is provided for controlling power to the op-amp U1. MOSFET Q5 allows the op-amp U1 to be powered down when it is not needed (e.g. during periods when no resistance measurement is needed). In an embodiment, the MOSFET Q5 is configured to provide an op-amp shutoff that is synchronized with the PWM signal. This functionality is particularly valuable where the op-amp has high power consumption (for example, it may be a high-performance, high-bandwidth part which may consume up to 100 mW during operation).

In the example of FIG. 6 the MOSFETs Q3 and Q5 are provided as separate devices but this is not essential. In other embodiments, the MOSFETs Q3 and Q5 may be implemented in a single device. Combining the two devices in this manner may result in slightly worse performance of the circuit (e.g. because it introduces an effective common-mode error to the op-amp U1 input and output). However, if the op-amp U1 is low power and the FET has a very low Rds (on) resistance, the saving in terms of smaller footprint and reduced cost of implementation may be worthwhile.

As discussed above, the provision of a bypass unit for removing the sense resistor 2 from the circuit when not needed makes it possible to increase the size of the sense resistor 2 without significantly reducing overall efficiency. Increasing the size of the sense resistor 2 tends to produce a larger output, which reduces the gain required from the op-amp U1. This can either be translated into faster response from the op-amp U1, or may even allow the fitting of a lower specification part (which may well have lower power consumption and/or cost).

In an alternative embodiment, the op-amp U1 is provided with a shutdown pin, which allows a shutdown signal to be applied directly to the op-amp. In an embodiment of this type an extra MOSFET, such as the MOSFET Q5 shown in FIG. 5, may be omitted, thus saving cost and/or improving transient performance. In alternative embodiments, the configuration of FIG. 6 is adapted to place one or more of Q3, Q4 and Q5 on the high side of their respective loads.

In the embodiments shown, the transistors (e.g. Q1-Q5) are independent, discrete transistors. However, in other embodiments two or more of the transistors can be packaged together, for example into duals or quads.

Additionally, low-side pull-down can be achieved by standard GPIOs available on microcontrollers. However, given the very accurate nature of the resistance measurement which needs to be made, careful consideration needs to be made before replacing any of the MOSFETs with a GPIO pull-down.

Figure 7A:
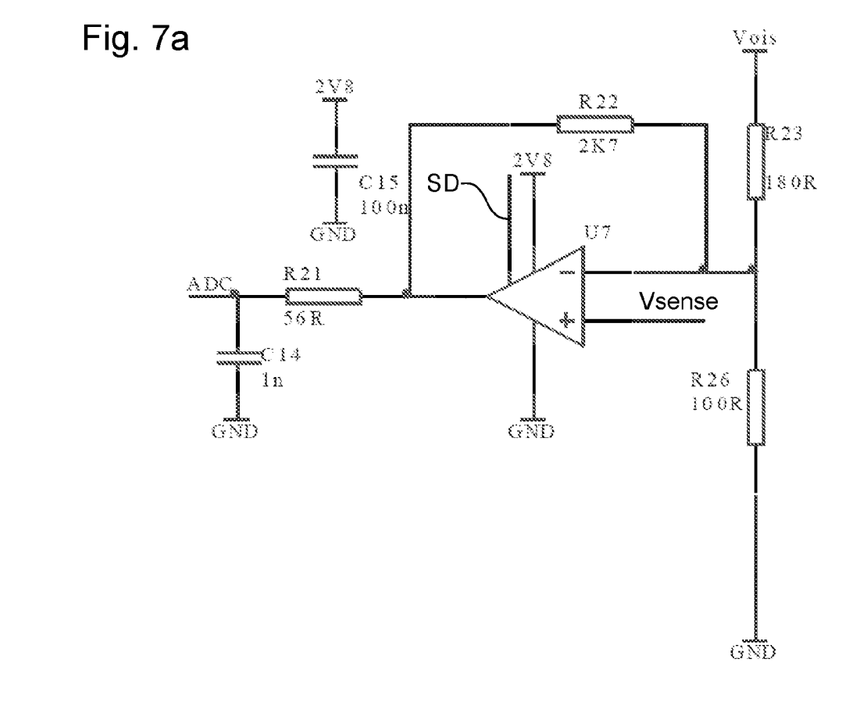
FIG. 7a depicts a resistance detection front end of an example circuit for driving a plurality of SMA actuators.
Figure 7B:
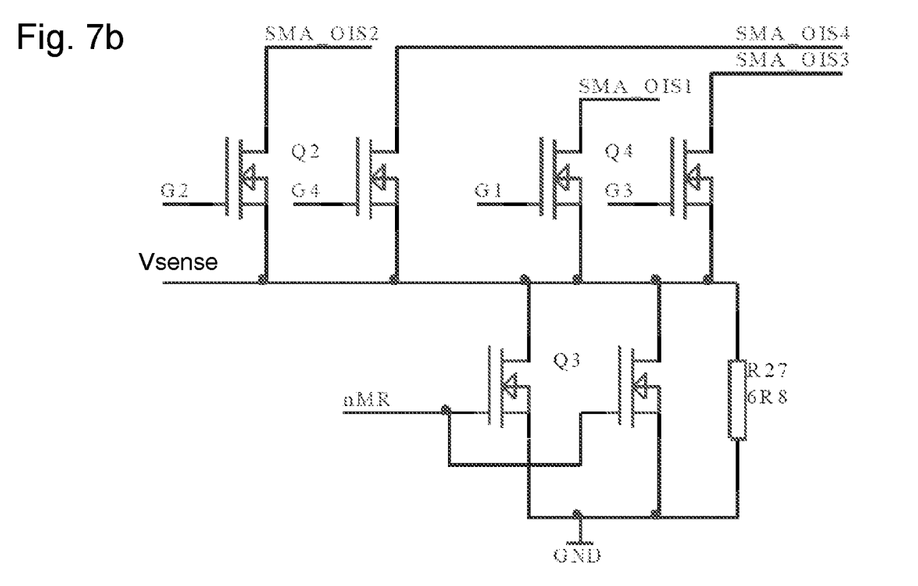

In an example application, the circuit is modified to drive a plurality of SMA actuators/wires, such as four SMA wires. Such an application may be used, for example, for driving an actuator for Optical Image Stabilization (OIS) in a miniature camera. A suitable example circuit is shown in FIGS. 7a and 7b. FIG. 7a depicts a resistance detection front-end and FIG. 7b depicts a power delivery stage for the actuators. Values indicated for specific resistors, capacitors and voltages are examples only.

In this particular example, selection between the four SMA actuators SMA_OIS1-4 can be made via input signals G1-G4 to the respective dual FETs Q4 and Q2 (FIG. 7b). The individual FETs within those packages Q2/Q4 connect to one end of the driven SMA actuators SMA_OIS 1-4. In this circuit all of the other ends of the SMA actuators SMA_OIS 1-4 are connected to one common voltage Vois from which the actuator power is supplied (usually 2.8V, but sometimes as high as 3.3V or as low as 1.8V).

The op-amp U7 is configured to measure the resistance of the SMA actuators SMA_OIS1-4 when the sense resistor R27 (FIG. 7b) is not bypassed by the dual FET Q3, via the sense voltage Vsense. A shut-down signal SD may be provided to the op-amp U7 to selectively shut down the op-amp U7 when it is not needed. The sense resistor R27 can be selectively bypassed according to the signal nMR supplied to the dual FET Q3. In this case, both FETS in the package Q3 are being used to bypass the sense resistor R27. In an embodiment, the SD signal may be an inverted form of the nMR signal (such that the amplifier U7 is shut down [SD=low] when the sense resistor R27 is bypassed [nMR=high]).

Using both FETs in the dual FET Q3 halves the resistance measurement error due to the typical Rds(on) of the FET. However, in other implementations only one of the FETs of the Q3 package is used to bypass the sense resistor. In this case, the other FET of Q3 is connected to the low side of R26 (and the ground connection at that point is removed). This saves the static current flowing through the divider (which may be quite substantial—e.g. typically 28 mW continuous in this specific example).

The extra power range which the bypass Q3 affords is highly desirable in this example. The particular reason for this is that it allows (in typical cases) the SMA actuators SMA_OIS1-4 to be driven perfectly in quadrature (that is, with none of the SMA actuators SMA_OIS1-4 requiring power for more than 25% of the PWM cycle). This may be important because power supply current may be strictly limited (this is typically the case for example in the context of a camera subsystem). If the SMA actuators cannot be driven in quadrature, a number of problems may arise—the current limit of the power supply may need to be roughly doubled, and if a simple PWM scheme is used, the total current flow (important for being able to measure current in a resistor very accurately) is unknown both at the start and end of any given pulse. These considerations could be avoided by creating one or more duplicates of the pre-amp stage, but this may not be desirable in the restricted space available for these circuits, and cost may also be increased.

The invention claimed is:
1. A drive circuit for actuating a shape-memory alloy actuator, comprising:
  a resistance detecting circuit comprising a sense resistor and configured to receive the shape-memory alloy actuator;

a sensing circuit for generating an output signal when a voltage is applied to the resistance detecting circuit to cause a current to be driven through both the sense resistor and the shape-memory alloy actuator, the output signal being based on said current and being a function of the difference between the resistance of the sense resistor and the resistance of the shape-memory alloy actuator; and a bypass unit configured to allow the sense resistor to be selectively bypassed, thereby allowing the drive circuit to be selectively operated in one of a measurement mode and a drive mode, the measurement mode being a mode in which the sense resistor is not bypassed and said output signal that is a function of the difference between the resistance of the sense resistor and the resistance of the shape-memory alloy actuator is obtained, and the drive mode being a mode in which a current is driven through at least the shape-memory alloy actuator but the sense resistor is bypassed, wherein said output signal is not obtained or said output signal is not a function, or is a weaker function, of the difference between the resistance of the sense resistor and the resistance of the shape-memory alloy actuator.

2. A drive circuit according to claim 1, wherein the resistance detecting circuit comprises a bridge.

3. A drive circuit according to claim 2, wherein:
the bridge comprises two branches, one of the branches comprising the sense resistor and being configured to receive the shape-memory alloy actuator in series with the sense resistor; and
the sensing circuit comprises a differential amplifier connected to an intermediate point in each of the two branches and configured to generate the output signal by amplifying a difference in voltage between the two intermediate points.

4. A drive circuit according to claim 3, wherein:
the bridge has a low voltage side connectable or connected to a low voltage source and a high voltage side connectable or connected to a high voltage source;
the sense resistor is connected between the low voltage side and the intermediate point in the branch comprising the sense resistor and the shape-memory alloy actuator; and
the bypass unit is configured to disconnect the low voltage side of the bridge from the low voltage source and connect the intermediate point in the branch comprising the sense resistor and the shape-memory alloy actuator to the low voltage source, in order to bypass the sense resistor.

5. A drive circuit according to claim 4, wherein the bypass unit is configured to use at least one N-FET to perform said disconnection of the low voltage side of the bridge from the low voltage source and connection of the intermediate point in the branch comprising the sense resistor and the shape-memory alloy actuator to the low voltage source.

6. A drive circuit according to claim 3, wherein:
the bypass unit is configured to provide a switchable, short-circuiting connection around the sense resistor in order to bypass the sense resistor.

7. A drive circuit according to claim 6, wherein:
the bridge has a low voltage side connectable or connected to a low voltage source and a high voltage side connectable or connected to a high voltage source; and either:
the sense resistor is connected between the high voltage side and the intermediate point in the branch comprising the sense resistor and the shape-memory alloy actuator, and the bypass unit is configured to provide a switchable, short-circuiting connection between the intermediate point in the branch comprising the sense resistor and the shape-memory alloy actuator and the high voltage side or source in order to bypass the sense resistor; or the sense resistor is connected between the low voltage side and the intermediate point in the branch comprising the sense resistor and the shape-memory alloy actuator, and the bypass unit is configured to provide a switchable, short-circuiting connection between the intermediate point in the branch comprising the sense resistor and the shape-memory alloy actuator and the low voltage side or source in order to bypass the sense resistor.

8. A drive circuit according to claim 1, further comprising a pulse-width modulator for providing a pulse-width modulated current through the shape-memory alloy actuator in accordance with a pulse-width modulation control signal.

9. A drive circuit according to claim 8, further comprising:
a controller configured to provide the pulse-width modulation control signal, wherein:
the controller is further configured to provide a bypass control signal for controlling the bypass controller, the bypass control signal being such as to cause the bypass unit to bypass the sense resistor for a predetermined portion of each pulse-width modulation cycle.

10. A drive circuit according to claim 9, wherein the pulse-width modulation and bypass control signals are such that the sense resistor is bypassed for a majority of the time that the drive circuit is supplying current to the shape-memory alloy actuator.

11. A drive circuit according to claim 9, wherein the bypass control signal is synchronized with the pulse-width modulation control signal.

12. A drive circuit according to claim 11, wherein the bypass and pulse-width modulation control signals are such that the start of a period during which the sense resistor is bypassed substantially coincides with the start of a period during which the pulse-width modulation control signal is high.

13. A drive circuit according to claim 9, wherein the controller is configured selectively to operate the drive circuit in a first state or a second state, wherein:
in the first state the sense resistor is bypassed for a first portion of the time during which current is being driven through the shape-memory alloy actuator; and
in the second state the sense resistor is bypassed for a second portion of the time during which current is being driven through the shape-memory alloy actuator or for none of the time during which current is being driven through the shape-memory alloy actuator, the first portion being larger than the second portion.

14. A drive circuit according to claim 13, wherein the controller is configured to switch the drive circuit from the first state to the second state when a power to be delivered to the shape-memory alloy falls below a predetermined threshold power.

15. A drive circuit according to claim 13, wherein the controller is configured to switch the drive circuit from the first state to the second state when the ambient temperature rises above a predetermined threshold temperature.

16. A drive circuit according to claim 1, configured such that power to the sensing circuit is reduced or cut off for at least a portion of the time during which the bypass unit bypasses the sense resistor.

17. A shape-memory alloy actuation apparatus, comprising:
- a support structure;
- a movable element that is movable relative to the support structure; and
- a drive circuit according to claim 1 and comprising the shape-memory alloy actuator, wherein the shape-memory alloy actuator is configured to apply a force to the movable element in order to move the movable element.

18. A shape-memory alloy actuation apparatus according to claim 17, wherein the shape-memory alloy actuator apparatus is a camera apparatus further comprising an image sensor fixed to the support structure, and the movable element comprises a camera lens element comprising one or more lenses arranged to focus an image on the image sensor.

19. A method of actuating a shape-memory alloy actuator, comprising:
- in a measurement phase, applying a voltage across a bridge comprising a sense resistor to measure the resistance of the shape-memory alloy actuator;
- in a drive phase, using a bypass unit to bypass the sense resistor while still driving current through the shape-memory alloy actuator in order to drive the shape-memory alloy actuator.

* * * * *